United States Patent
De Bellis et al.

(10) Patent No.: US 11,808,208 B2
(45) Date of Patent: Nov. 7, 2023

(54) INTEGRATED LUBRICATION SYSTEM

(71) Applicant: GE Avio S.r.l., Rivalta di Torino (IT)

(72) Inventors: Fabio De Bellis, Turin (IT); Leonardo Orlando, Turin (IT); Cristiano Consales, Fecce (IT); Francesco Santacroce, Turin (IT)

(73) Assignee: GE AVIO S.R.L., Rivalta di Torino (IT)

( * ) Notice: Subject to any disclaimer, the term of this patent is extended or adjusted under 35 U.S.C. 154(b) by 0 days.

(21) Appl. No.: 17/663,536

(22) Filed: May 16, 2022

(65) Prior Publication Data

US 2023/0160341 A1     May 25, 2023

(30) Foreign Application Priority Data

Nov. 25, 2021    (IT) .................... IT102021000029891

(51) Int. Cl.
*F02C 7/06*         (2006.01)
*B64D 33/08*      (2006.01)
(Continued)

(52) U.S. Cl.
CPC ................ *F02C 7/06* (2013.01); *B64D 33/08* (2013.01); *F02C 7/36* (2013.01); *F16H 57/0423* (2013.01); *F16H 57/0471* (2013.01)

(58) Field of Classification Search
CPC ... F02C 7/06; F02C 7/36; B64D 33/08; F16H 57/0423; F16H 57/0471
See application file for complete search history.

(56) References Cited

U.S. PATENT DOCUMENTS 9,238,975 B2    1/2016   Detry et al.
9,416,680 B2    8/2016   Homeyer
(Continued)

FOREIGN PATENT DOCUMENTS

FR     3024498 A1    2/2016
FR     3127024 A1    3/2023
(Continued)

OTHER PUBLICATIONS

Parker et al., "Performance of Large-Bore Tapered-Roller Bearings Under Combined Radial and Thrust Load at Shaft Speeds to 15 000 RPM," NASA Technical Note, Lewis Research Center, National Aeronautics and Space Administration (1977).

*Primary Examiner* — Jacob M Amick
*Assistant Examiner* — Charles J Brauch
(74) *Attorney, Agent, or Firm* — Venable LLP; Elizabeth C. G. Gitlin; Michele V. Frank (57) ABSTRACT

An integrated lubrication system and an engine that includes the integrated lubrication system. The system has a first and a second lubrication supply line and one or more spray bars. The first lubrication supply line extends radially inward toward a central axis of the engine, has a first plurality of jet outlets, and is configured to deliver a lubrication fluid to a first location on one or more engine components. The second lubrication supply line extends parallel to the central axis, has a second plurality of jet outlets, and is configured to deliver the lubrication fluid to a second location on the one or more engine components. The first lubrication supply line is configured to lubricate the one or more engine components in a first engine power condition and the second lubrication supply line is configured to lubricate the one or more engine components in a second engine power condition.

20 Claims, 4 Drawing Sheets

(51) Int. Cl.
*F02C 7/36* (2006.01)
*F16H 57/04* (2010.01)

(56) References Cited

U.S. PATENT DOCUMENTS

| | | |
|---|---|---|
| 9,976,483 B2 | 5/2018 | Venter |
| 10,415,693 B2 | 9/2019 | Mtamura |
| 10,648,383 B2 | 5/2020 | McCune et al. |
| 10,663,054 B2 | 5/2020 | Gravina et al. |
| 2010/0150702 A1 | 6/2010 | Sheridan et al. |
| 2013/0225353 A1 | 8/2013 | Gallet et al. |
| 2018/0051706 A1 | 2/2018 | DiBenedetto |
| 2019/0048802 A1 | 2/2019 | Desjardins et al. |
| 2019/0360578 A1 | 11/2019 | Chevillot et al. |
| 2020/0256211 A1 | 8/2020 | Davis et al. |
| 2021/0062910 A1 | 3/2021 | Baraggia Au Yeung et al. |

FOREIGN PATENT DOCUMENTS

| | | |
|---|---|---|
| FR | 3127025 A1 | 3/2023 |
| FR | 3129436 A1 | 5/2023 |

INTEGRATED LUBRICATION SYSTEM

CROSS REFERENCE TO RELATED APPLICATIONS

The present application claims the benefit of Italian Patent Application No. 102021000029891, filed on Nov. 25, 2021, which is hereby incorporated by reference herein in its entirety.

TECHNICAL FIELD

The present disclosure relates to an integrated lubrication system. More particularly, the present disclosure relates to an integrated lubrication system for a bearing and a seal.

BACKGROUND

In modern aircraft engines, lubrication systems are provided to cause a flow of lubrication fluid to mechanical components. The mechanical components require continuous lubrication to avoid wearing and overheating. For example, mechanical components such as propeller shaft support bearings and carbon seals require lubrication. These components require significant flow rates to withstand high loads and to provide cooling that counteracts generated friction. Lubrication systems typically include dedicated piping externally routed on the stationary engine frame.

BRIEF DESCRIPTION OF THE DRAWINGS

Features and advantages of the present disclosure will be apparent from the following description of various exemplary embodiments, as illustrated in the accompanying drawings, wherein like reference numbers generally indicate identical, functionally similar, and/or structurally similar elements.

DETAILED DESCRIPTION

Features, advantages, and embodiments of the present disclosure are set forth or apparent from a consideration of the following detailed description, drawings, and claims. Moreover, it is to be understood that the following detailed description are exemplary and intended to provide further explanation without limiting the scope of the disclosure as claimed.

Various embodiments are discussed in detail below. While specific embodiments are discussed, this is done for illustration purposes only. A person skilled in the relevant art will recognize that other components and configurations may be used without departing from the spirit and scope of the present disclosure.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

The present disclosure relates to an integrated lubrication system that provides lubrication fluid to multiple elements within an engine. In one example, the integrated lubrication system provides lubrication fluid to multiple bearings in an engine. The bearings may be propeller shaft bearings. In one example, the integrated lubrication system provides lubrication fluid to multiple bearings and a carbon seal in an engine. The integrated lubrication system of the present disclosure may allow for providing lubrication fluid to multiple elements of an engine during low power operating conditions (e.g., engine idling conditions, aircraft taxiing conditions, etc.) and high power operating conditions (e.g., aircraft take off conditions, aircraft climbing conditions, etc.). The integrated lubrication system of the present disclosure may allow for providing lubrication fluid to multiple elements of an engine without the need for a dedicated lubrication supply line to each element of the multiple elements. This may be achieved through the use of spray bars and jet outlets.

Figure 1:
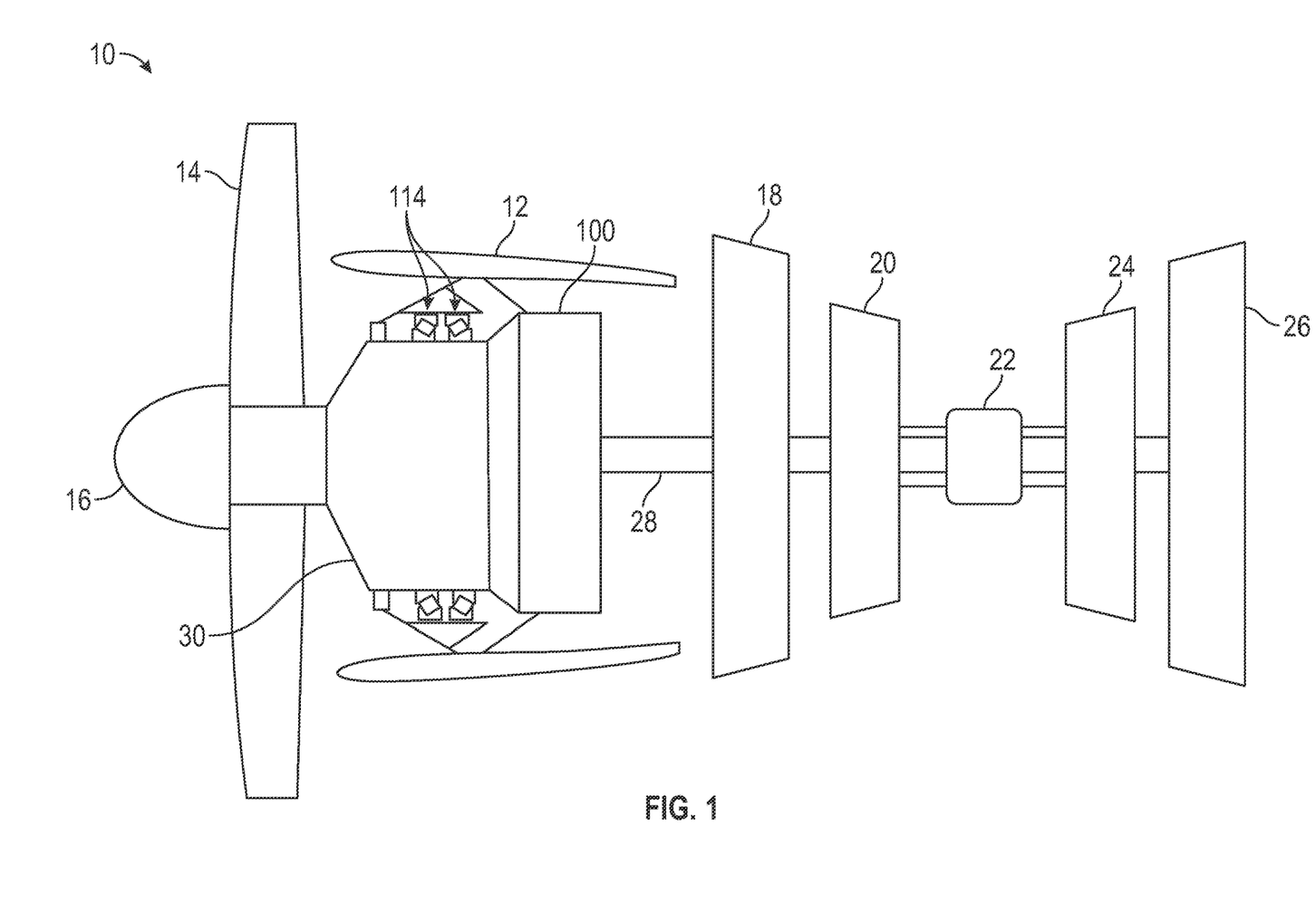
FIG. 1 shows a schematic view of an engine, according to an embodiment of the present disclosure.

FIG. 1 shows an engine 10. The engine 10 may be a turboprop engine or an unducted single fan engine. The engine 10 may include a nacelle 12. The nacelle 12 houses a gearbox assembly 100, a propeller shaft 30, and a shaft 28. A plurality of bearings 114 may be located between the propeller shaft 30 and the nacelle 12 to allow relative rotation therebetween. The plurality of bearings 114 may be propeller shaft bearings. A plurality of fan blades 14 are coupled to the propeller shaft 30. Rotation of the shaft 28 causes rotation of the propeller shaft 30 which in turn causes rotation of the plurality of fan blades 14. A nose 16 may be coupled at a forward end of the engine 10.

With continued reference to FIG. 1, the shaft 28 is rotationally coupled to a low pressure compressor 18 and a low pressure turbine 26. The engine 10 also includes a high pressure compressor 20, a combustor 22, and a high pressure turbine 24. The engine 10 operates in a manner well known in the art.

Figure 2:
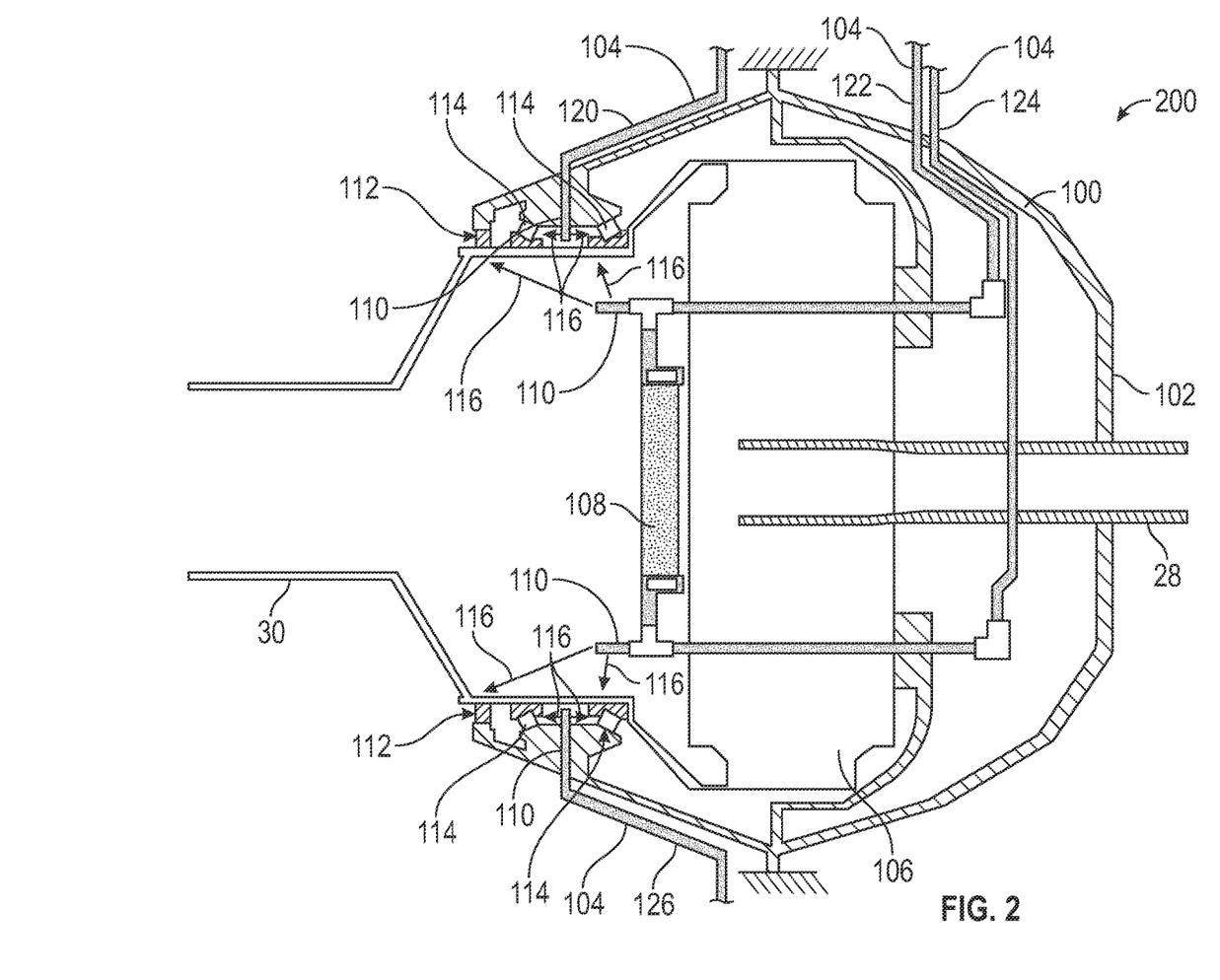
FIG. 2 shows a schematic, cross-sectional view of a gearbox assembly and a propeller shaft of the engine of FIG. 1 having an integrated lubrication system, the cross section taken along a centerline of the engine of FIG. 1 according to an embodiment of the present disclosure.
Figure 3:
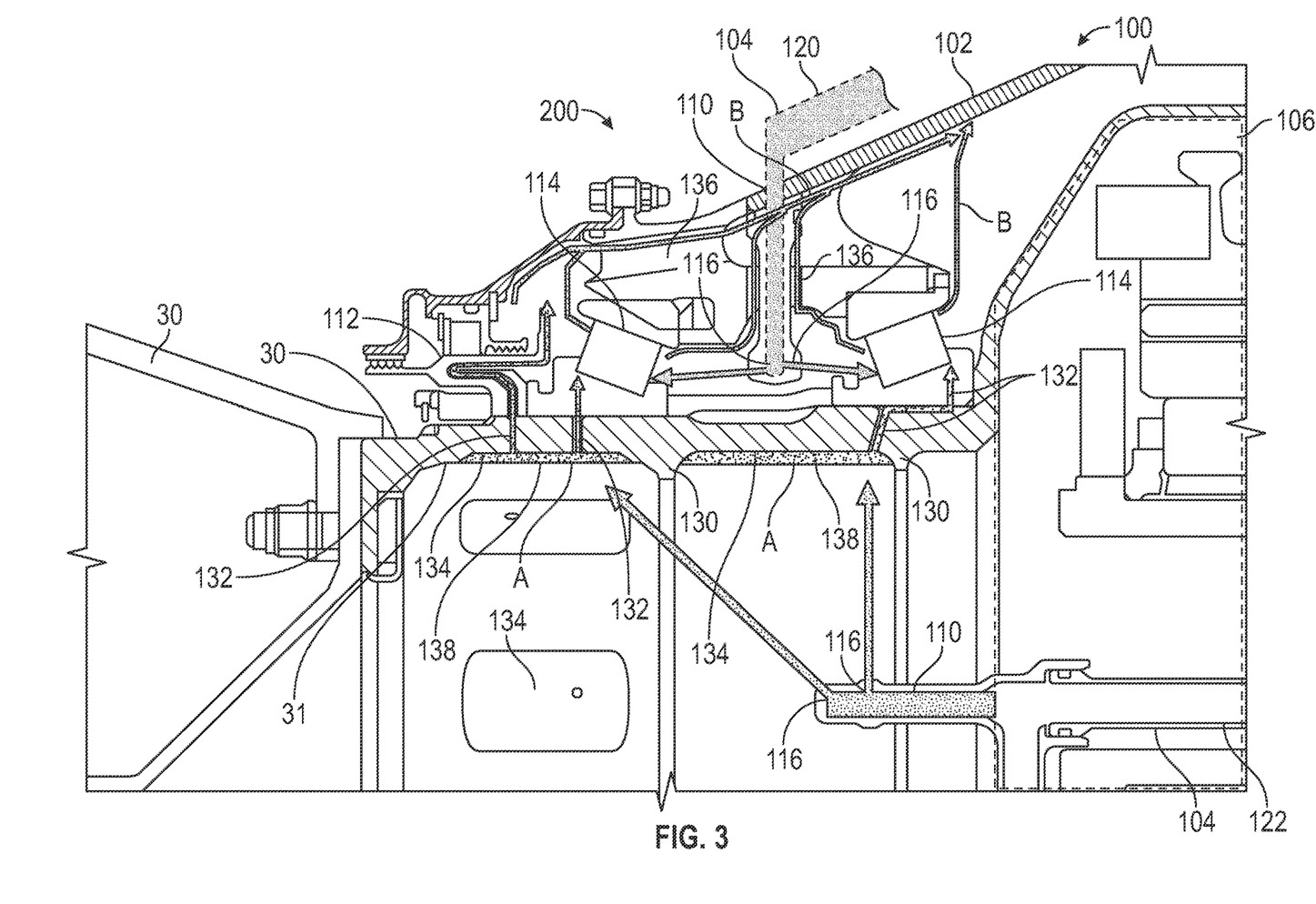
FIG. 3 shows a schematic, partial cross-sectional view of the integrated lubrication system of FIG. 2, according to an embodiment of the present disclosure.

FIGS. 2 and 3 show partial cross-sectional views of the gearbox assembly 100 and propeller shaft 30 of FIG. 1. The gearbox assembly 100 may include a gearbox 106 that couples the propeller shaft 30 to the shaft 28 (FIG. 2). An integrated lubrication system 200 exists in the gearbox assembly 100 and the propeller shaft 30. That is, the integrated lubrication system 200 is integrated between a forward end of the gearbox assembly 100 and an aft end of the propeller shaft 30. The integrated lubrication system 200 may be housed within the propeller shaft 30 and a gearbox housing 102 of the gearbox assembly 100. The integrated lubrication system 200 may provide lubrication to one or more seals 112 and one or more bearings 114. The one or more seals 112 may be a carbon seal. The one or more bearings 114 may be tapered rolling bearings.

The integrated lubrication system 200 may include a plurality of lubrication supply lines 104 and one or more scavenge features 136. The plurality of lubrication supply lines 104 may include a first gearbox supply line 122, a second gearbox supply line 124, a first bearing supply line 120, and a second bearing supply line 126. Although two of each of the gearbox supply line and bearing supply line are shown, more or fewer may be provided. Each of the plurality of lubrication supply lines 104 may include a spray bar 110.

Each spray bar 110 has one or more jet outlets 116 through which a lubrication fluid may exit the respective lubrication supply line 104. The spray bars 110 may be leaning onto the propeller shaft hollow cavity to spill the oil from a gearbox oil manifold 108 and to target the rotating propeller shaft 30 (e.g., one or more grooves 134 therein). Although two jet outlets 116 are shown, more or fewer may be provided. The first gearbox supply line 122 and the second gearbox supply line 124 may supply a lubrication fluid to the gearbox oil manifold 108. The one or more scavenge features 136 may allow for the lubrication fluid from the seal 112 and/or the one or more bearings 114 to drain toward the scavenge port (not visible).

The lubrication fluid supplied in the plurality of lubrication supply lines 104 may be oil. The lubrication fluid may be caused to flow to the plurality of lubrication supply lines 104 from a lubrication fluid supply source (not shown). The lubrication fluid may be a pressurized lubrication fluid, such as, for example, a pressurized oil.

In FIG. 3, two areas of lubrication are shown and may include a first region of lubrication A and a second region of lubrication B. The lubrication fluid may be present in the first region of lubrication A and may be supplied from the first gearbox supply line 122. A similar first region of lubrication A may be located on a not visible bottom portion of the integrated lubrication system 200 and the lubrication fluid therein may be supplied by the second gearbox supply line 124 (FIG. 2). The first region of lubrication A may include one or more grooves 134 formed in an inner wall 31 of the propeller shaft 30. When multiple components need lubrication (e.g., multiple bearings and seals), one or more separators 130 may be present on the propeller shaft 30 to generate independent cavities within the one or more grooves 134, such as cavities 138 for the lubrication fluid. The one or more grooves 134 and/or cavities 138 may collect the lubrication fluid from the spray bars 110 of the first gearbox supply line 122 and the second gearbox supply line 124 and supply the collected lubrication fluid to the components in need of lubrication. In the case of the system 200 shown in FIG. 3, this results in delivery of lubrication fluid form the cavities 138 to the seal 112 and both of the depicted one or more bearings 114. The first region of lubrication A, and, thus, the lubrication fluid therein, may extend through pass-through holes 132 in a wall of the propeller shaft 30 to the seal 112 and the one or more bearings 114. The lubrication fluid present in the first region of lubrication A may be subject to centrifugal forces, as will be described herein.

With continued reference to FIG. 3, the second region of lubrication B may include spaces formed between the gearbox housing 102, the seal 112, the one or more bearings 114, and the plurality of lubrication supply lines 104. The second region of lubrication B may include the lubrication fluid present in the one or more scavenge features 136. The lubrication fluid present in the second region of lubrication B may be supplied from the seal 112 and/or the one or more bearings 114. The lubrication fluid present in the second region of lubrication B may represent lubrication fluid draining from the integrated lubrication system 200. The lubrication fluid present in the second region of lubrication B may be subject to gravitational forces, as will be described herein.

Figure 4:
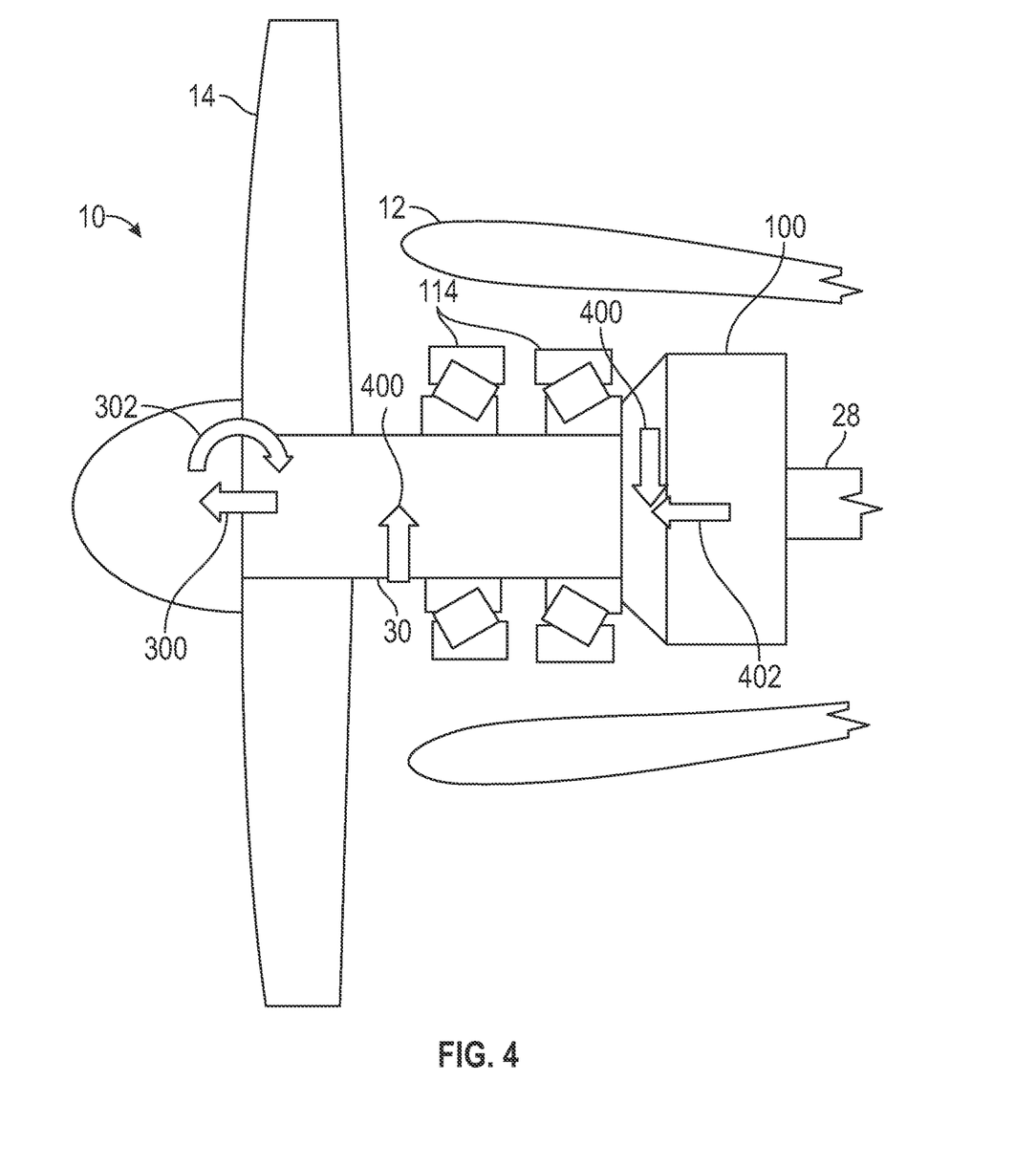
FIG. 4 shows a schematic, partial view of the engine of FIG. 1, according to an embodiment of the present disclosure.

A forward end of the engine 10 is shown in FIG. 4. As previously described, the engine 10 may include a plurality of fan blades 14 and a nacelle 12. The nacelle 12 may house a gearbox assembly 100 and one or more bearings 114 coupled to the propeller shaft 30. An aft end of the gearbox assembly 100 may be coupled to the shaft 28. During operation of the engine 10, a thrust 300 and a moment 302 are generated. The thrust 300 and the moment 302 may result in a radial load 400 on the one or more bearings 114 and an axial load 402 on the one or more bearings 114.

With reference to FIGS. 1 to 4, the one or more bearings 114 and the seals 112 may be subject to high load and/or high rotational speed conditions, thus, needing continuous lubrication to avoid wearing and overheating. The one or more bearings 114 require significant oil flow rates to withstand high loads given by the propeller shaft 30. The seals 112 require a cooling oil flow to counteract the friction generated by the rubbing faces of the seals 112. The integrated lubrication system 200 provides a plurality of lubrication supply lines 104 that have compact architectures allowing different arrangements (e.g., oil jets and under-race lubrication) to achieve optimal performances throughout operation of the engine 10. The integrated lubrication system 200 provides an integration strategy of the lubrication system for multiple components arrangement (e.g., propeller shaft bearings and carbon seals) with the engine frame and other modules, including both jet and under-race lubrication. That is, the integrated lubrication system 200 combines the lubrication systems of the one or more bearings 114 and the seals 112. The plurality of lubrication supply lines 104 are integrated together with other existing lubrication items, such as, for example, the gearbox oil manifold 108. The integrated lubrication system 200 results in whole portions of supply lines being avoided, with a resulting reduction in weight, parts count, and system complexity.

With reference to FIGS. 2 and 3, the integrated lubrication system 200 of the present disclosure allows for improved lubrication of multiple elemental arrangements, which are difficult to reach with dedicated lubrication supply lines, for example, the one or more bearings 114 (which may be two rows of propeller shaft bearings) and the seal 112 (which may be a carbon seal). The dual lubrication of the integrated lubrication system 200 allows for jet lubrication (e.g., via jet outlets 116) and allows for under-race lubrication (e.g., under the bearing race of the one or more bearings 114).

A jet lubrication flow may be supplied with a dedicated pressurized line (e.g., the one or more lubrication supply lines 104 may be dedicated pressurized supply lines) that provides a lubrication (e.g., oil) to an innermost diameter of the one or more bearings 114. This is shown in FIG. 3 via the first bearing supply line 120 having two jet outlets 116, each being directed to one of the two bearings of the one or more bearings 114. The lubrication is axially pumped toward the outer sides of the roller elements of the one or more bearings 114 due to the rotating motion of the roller element. The lubrication jets are, therefore, independent of shaft angular speed (e.g., angular speed of the propeller shaft 30). This may provide improved performance in low speed engine conditions, such as, for example, but not limited to, ground idle and taxi conditions of an aircraft.

The under-race lubrication flow is spilled from another oil manifold, such as, for example, the gearbox oil manifold 108, by means of one or more spray bars 110. The lubrication flow is sprayed and then collected within the one or more grooves 134. The one or more grooves 134 may be rotating grooves (as they are located along the inner wall of the rotating propeller shaft 30). Therefore, lubrication is pumped (via a centrifugal pumping effect) through several radial holes (e.g., pass-through holes 132) to supply the lubrication fluid to the bearing inner races (also referred to as under races) of the one or more bearings 114 by the centrifugal forces generated in the system. This is shown in FIG. 3 by the first gearbox supply line 122 having a spray bar 110 that delivers lubrication to the one or more grooves 134, the pass-through holes 132, and, thus, under both of the two bearings shown of the one or more bearings 114 and to the seal 112. The under race lubrication flow arrangement described herein may avoid the need to have a dedicated lubrication line to each of the one or more bearings 114 and the seal 112. Lubrication is then provided to critical locations, where high loads and metal-to-metal sliding occur. For example, on the tapered roller bearings of the one or more bearings 114, this may be the interface between the shoulder and the roller element. The full effectiveness of the under race lubrication takes place during high speed and high load engine conditions, such as, for example, but not limited to, take off and climb conditions of an aircraft.

In the integrated lubrication system of the present disclosure, additional elements may require lubrication as well (e.g., additional bearings and/or seals). For example, the seal 112 may be provided with lubrication fluid and may share the same channels with the one or more bearings 114. One or more separators 130 may be dedicated circumferential separators in the inner propeller shaft walls of the propeller shaft 30 to generate cavities 138 for supplying lubrication fluid to the one or more additional elements. The separators 130 may assist in separating the lubrication flows for the carbon seal and the propeller-shaft bearings. Furthermore, jet lubrication is performed by means of dedicated spray bars targeting the inner-most diameter of the rolling elements.

The integrated lubrication system 200 of the present disclosure may be implemented in any engine or turboprop engine to improve the lubrication of elements that are difficult to reach or to access. The integrated lubrication system 200 of the present disclosure reduces weight, part count, and system complexity, while taking advantage of already existing lubrication devices (e.g., reduction gearbox oil manifold). The integrated lubrication system 200 of the present disclosure may be extended to lubricate arrangements of multiple components (e.g., the propeller shaft bearings and the carbon seals). The integrated lubrication system 200 of the present disclosure combines jets (e.g., jet outlet 116) and under race lubrication (e.g., as shown via first bearing supply line 120 in FIG. 2), which improves the lubrication quality and offers maximum performance throughout operation of the engine 10 (FIG. 1).

The plurality of lubrication supply lines 104 may include one or more lubrication supply lines (e.g., 120 and 126 of FIG. 2), that extend radially inward toward a central axis of the engine 10 (FIG. 1). The plurality of lubrication supply lines 104 may include one or more lubrication supply lines (e.g., 122 and 124 of FIG. 2), that extend parallel along the central axis of the engine 10 (FIG. 1).

Further aspects of the present disclosure are provided by the subject matter of the following clauses.

An integrated lubrication system for an engine includes a first lubrication supply line extending radially inward toward a central axis of the engine and having a first plurality of jet outlets and configured to deliver a lubrication fluid to a first location on one or more engine components, a second lubrication supply line extending parallel to the central axis and having a second plurality of jet outlets and configured to deliver the lubrication fluid to a second location on the one or more engine components, and one or more spray bars coupled with the first lubrication supply line, the second lubrication supply line, or both the first lubrication supply line and the second lubrication supply line, the one or more spray bars configured to direct the lubrication fluid towards the one or more engine components. The first lubrication supply line is configured to lubricate the one or more engine components in a first engine power condition and the second lubrication supply line is configured to lubricate the one or more engine components in a second engine power condition, the second engine power condition having a greater power output than the first engine power condition.

The integrated lubrication system of the preceding clause, further including a manifold, wherein the second lubrication supply line is configured to spill the lubrication fluid from the manifold to the one or more engine components.

The integrated lubrication system of any preceding clause, wherein the first lubrication supply line and the second lubrication supply line are each pressurized such that the lubrication fluid is a pressurized lubrication fluid.

The integrated lubrication system of any preceding clause, wherein the first lubrication supply line and the second lubrication supply line each comprises more than one lubrication supply line.

The integrated lubrication system of any preceding clause, wherein the lubrication fluid from the second lubrication supply line is pumped via a centrifugal pumping action toward the one or more engine components.

The integrated lubrication system of any preceding clause, further including one or more scavenge features configured to drain the lubrication fluid.

The integrated lubrication system of any preceding clause, further including a groove and one or more pass-through holes, the groove configured to receive the lubrication fluid from the second lubrication supply line and to deliver the lubrication fluid through the one or more pass-through holes to the one or more engine components.

The integrated lubrication system of any preceding clause, further including one or more separators, the one or more separators configured to divide the groove into a plurality of cavities.

The integrated lubrication system of any preceding clause, wherein the one or more engine components includes one or more bearings.

The integrated lubrication system of any preceding clause, wherein the one or more engine components further includes a seal.

The integrated lubrication system of any preceding clause, wherein the first lubrication supply line is configured to deliver the lubrication fluid to an innermost diameter of the one or more bearings and the second lubrication supply line is configured to deliver the lubrication fluid to an inner race of the one or more bearings.

An engine includes a gearbox assembly includes a gearbox housing, a propeller shaft, one or more bearings located between the propeller shaft and the gearbox housing and configured to allow relative rotation of the propeller shaft with respect to the gearbox housing, and an integrated lubrication system. The integrated lubrication system includes a first lubrication supply line configured to supply a lubrication fluid to an innermost diameter of each bearing of the one or more bearings, and a second lubrication supply line configured to supply the lubrication fluid to an inner race of each bearing of the one or more bearings.

The engine of the preceding clause, further includes a gearbox oil manifold, wherein the second lubrication supply line is configured to spill the lubrication fluid from the gearbox oil manifold to the one or more bearings.

The engine of any preceding clause, wherein the second lubrication supply line includes a spray bar configured to provide the lubrication fluid to a groove in the propeller shaft, which in turn provides the lubrication fluid to the inner race of the one or more bearings.

The engine of any preceding clause, wherein the first lubrication supply line and the second lubrication supply line each comprises more than one lubrication supply line.

The engine of any preceding clause, wherein the lubrication fluid from the second lubrication supply line is pumped via a centrifugal pumping action toward the one or more bearings.

The engine of any preceding clause, further including a seal that receives the lubrication fluid from the second lubrication supply line.

The engine of any preceding clause, further including one or more scavenge features configured to drain the lubrication fluid.

The engine of any preceding clause, further including a groove in an inner surface of the propeller shaft and one or more pass-through holes extending through the propeller shaft, the groove configured to receive the lubrication fluid from the second lubrication supply line and to deliver the lubrication fluid through the one or more pass-through holes to the inner race of the one or more bearings.

The engine any preceding clause, further including one or more separators, each being configured to divide the groove into a plurality of cavities.

Although the foregoing description is directed to the preferred embodiments, it is noted that other variations and modifications will be apparent to those skilled in the art, and may be made without departing from the spirit or scope of the disclosure Moreover, features described in connection with one embodiment may be used in conjunction with other embodiments, even if not explicitly stated above.

The invention claimed is:

1. An integrated lubrication system for an engine, the integrated lubrication system comprising:
    a first lubrication supply line extending radially inward toward a central axis of the engine and having a first plurality of j et outlets and configured to deliver a lubrication fluid to a first location on one or more engine components;
    a second lubrication supply line extending parallel to the central axis and having a second plurality of jet outlets and configured to deliver the lubrication fluid to a second location on the one or more engine components; and
    one or more spray bars coupled with the first lubrication supply line, the second lubrication supply line, or both the first lubrication supply line and the second lubrication supply line, the one or more spray bars configured to direct the lubrication fluid towards the one or more engine components,
    wherein the first lubrication supply line is configured to lubricate the one or more engine components in a first engine power condition and the second lubrication supply line is configured to lubricate the one or more engine components in a second engine power condition, the second engine power condition having a greater power output than the first engine power condition.

2. The integrated lubrication system of claim 1, further comprising a manifold, wherein the second lubrication supply line is configured to spill the lubrication fluid from the manifold to the one or more engine components.

3. The integrated lubrication system of claim 1, wherein the first lubrication supply line and the second lubrication supply line are each pressurized such that the lubrication fluid is a pressurized lubrication fluid.

4. The integrated lubrication system of claim 1, wherein the first lubrication supply line and the second lubrication supply line each comprises more than one lubrication supply line.

5. The integrated lubrication system of claim 1, wherein the lubrication fluid from the second lubrication supply line is pumped via a centrifugal pumping action toward the one or more engine components.

6. The integrated lubrication system of claim 1, further comprising one or more scavenge features configured to drain the lubrication fluid.

7. The integrated lubrication system of claim 1, further comprising a groove and one or more pass-through holes, the groove configured to receive the lubrication fluid from the second lubrication supply line and to deliver the lubrication fluid through the one or more pass-through holes to the one or more engine components.

8. The integrated lubrication system of claim 7, further comprising one or more separators, the one or more separators configured to divide the groove into a plurality of cavities.

9. The integrated lubrication system of claim 1, wherein the one or more engine components includes one or more bearings.

10. The integrated lubrication system of claim 9, wherein the one or more engine components further includes a seal.

11. The integrated lubrication system of claim 9, wherein the first lubrication supply line is configured to deliver the lubrication fluid to an innermost diameter of the one or more bearings and the second lubrication supply line is configured to deliver the lubrication fluid to an inner race of the one or more bearings.

12. An engine comprising:
    (A) a gearbox assembly having a gearbox housing;
    (B) a propeller shaft;
    (C) one or more bearings located between the propeller shaft and the gearbox housing and configured to allow relative rotation of the propeller shaft with respect to the gearbox housing; and
    (D) an integrated lubrication system having:
        (a) a first lubrication supply line configured to supply a lubrication fluid to an innermost diameter of each bearing of the one or more bearings; and
        (b) a second lubrication supply line configured to supply the lubrication fluid to an inner race of each bearing of the one or more bearings.

13. The engine of claim 12, further comprising a gearbox oil manifold, wherein the second lubrication supply line is configured to spill the lubrication fluid from the gearbox oil manifold to the one or more bearings.

14. The engine of claim 12, wherein the second lubrication supply line includes a spray bar configured to provide the lubrication fluid to a groove in the propeller shaft, which in turn provides the lubrication fluid to the inner race of the one or more bearings.

15. The engine of claim 12, wherein the first lubrication supply line and the second lubrication supply line each comprises more than one lubrication supply line.

16. The engine of claim 12, wherein the lubrication fluid from the second lubrication supply line is pumped via a centrifugal pumping action toward the one or more bearings.

17. The engine of claim 12, further comprising a seal that receives the lubrication fluid from the second lubrication supply line.

18. The engine of claim 12, further comprising one or more scavenge features configured to drain the lubrication fluid.

19. The engine of claim 12, further comprising a groove in an inner surface of the propeller shaft and one or more pass-through holes extending through the propeller shaft, the groove configured to receive the lubrication fluid from the second lubrication supply line and to deliver the lubrication fluid through the one or more pass-through holes to the inner race of the one or more bearings.

20. The engine of claim 19, further comprising one or more separators, each being configured to divide the groove into a plurality of cavities.

* * * * *